United States Patent
Pinarbasi

[19]

[11] Patent Number: 6,038,107
[45] Date of Patent: *Mar. 14, 2000

[54] ANTIPARALLEL-PINNED SPIN VALVE SENSOR

[75] Inventor: Mustafa Pinarbasi, Morgan Hill, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/958,607

[22] Filed: Oct. 27, 1997

[51] Int. Cl.$^7$ .................................................... G11B 5/39
[52] U.S. Cl. ............................................................ 360/113
[58] Field of Search ............................ 360/113; 324/252; 338/32 R

[56] References Cited

U.S. PATENT DOCUMENTS

| | | | |
|---|---|---|---|
| 5,408,377 | 4/1995 | Gurney et al. | 360/113 |
| 5,465,185 | 11/1995 | Heim et al. | 360/113 |
| 5,528,440 | 6/1996 | Fontana et al. | 360/113 |
| 5,563,752 | 10/1996 | Komuro et al. | 360/113 |
| 5,583,725 | 12/1996 | Coffey et al. | 360/113 |
| 5,701,223 | 12/1997 | Fontana, Jr. et al. | 360/113 |
| 5,705,973 | 1/1998 | Yuan et al. | 338/32 R |
| 5,725,963 | 3/1998 | Iwasaki et al. | 428/611 |
| 5,748,399 | 5/1998 | Gill | 360/66 |
| 5,766,743 | 6/1998 | Fujikata et al. | 428/212 |
| 5,768,069 | 6/1998 | Mauri | 360/113 |
| 5,768,071 | 6/1998 | Lin | 360/113 |
| 5,780,176 | 7/1998 | Iwasaki et al. | 428/692 |

OTHER PUBLICATIONS

IEEE Trans. on Mags., Y. Hamakawa et al., Spin–Valve Heads Utilizing Antiferromagnetic NiO Layers, vol. 32, No. 1, Jan. 96, pp. 149–155.

IEEE Trans. on Mags., C. Lin et al., "Magnetic Properties of NiFe Films Exchange–Coupled with NiO", vol. 31, No. 6, Nov. 95, pp. 4091–4093.

IEEE Trans. on Mags., T. Lin et al., "Exchange–Coupled Ni–Fe/Fe–Mn, Ni–Fe/Ni–Mn and NiO/Ni–Fe Films for Stabilization of Magnetoresistive Sensors", vol. 31, No. 6, Nov. 95, pp. 2585–2590.

IEEE Trans. on Mags., C. Lai et al., "Anisotropic Exchange for NiFe Films Grown on Epitaxial NiO", vol. 31, No. 6, Nov. 95, pp. 2609–2611.

*Primary Examiner*—Jefferson Evans
*Attorney, Agent, or Firm*—Paik Saber; William D. Gill

[57] ABSTRACT

An AP-Pinned SV sensor with the preferred structure of NiO/Ni—Fe/Co/Ru/Co/Cu/Ni—Fe/Cap where the pinned layer comprises first and second ferromagnetic pinned layers separated from each other by an anti-parallel coupling layer. The first ferromagnetic pinned layer further comprises a first pinned sub-layer of Ni—Fe and a second pinned sub-layer of Co where the first pinned sub-layer of Ni—Fe is formed over and in direct contact with the NiO antiferromagnetic (AFM) layer. Addition of the first pinned sub-layer of Ni—Fe isolates the second pinned sub-layer of Co from the NiO AFM layer resulting in dramatic improvement in the pinning field and magnetic moment control of the laminated AP-pinned layer.

14 Claims, 6 Drawing Sheets

ANTIPARALLEL-PINNED SPIN VALVE SENSOR

BACKGROUND OF THE INVENTION

1. Field of the Invention

This invention relates generally to spin valve magnetic transducers for reading information signals from a magnetic medium and, in particular, to an improved antiparallel-pinned spin valve sensor, and to magnetic recording systems which incorporate such sensors.

2. Description of Related Art

Computers often include auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material separated by a layer of non-magnetic electrically conductive material are generally referred to as spin valve (SV) sensors manifesting the SV effect. In an SV sensor, one of the ferromagnetic layers, referred to as the pinned layer, has its magnetization typically pinned by exchange coupling with an antiferromagnetic (e.g., NiO or Fe—Mn) layer. The magnetization of the other ferromagnetic layer, referred to as the free layer, however, is not fixed and is free to rotate in response to the field from the recorded magnetic medium (the signal field). In SV sensors, the SV effect varies as the cosine of the angle between the magnetization of the pinned layer and the magnetization of the free layer. Recorded data can be read from a magnetic medium because the external magnetic field from the recorded magnetic medium (the signal field) causes a change in the direction of magnetization in the free layer, which in turn causes a change in resistance of the SV sensor and a as corresponding change in the sensed current or voltage.

FIG. 1 shows a prior art SV sensor 100 comprising end regions 104 and 106 separated by a central region 102. A free layer (free ferromagnetic layer) 110 is separated from a pinned layer (pinned ferromagnetic layer) 120 by a non-magnetic, electrically-conducting spacer 115. The magnetization of the pinned layer 120 is fixed by an antiferromagnetic (AFM) layer 121. Free layer 110, spacer 115, pinned layer 120 and the AFM layer 121 are all formed in the central region 102. Hard bias layers 130 and 135 formed in the end regions 104 and 106, respectively, provide longitudinal bias for the free layer 110. Leads 140 and 145 formed over hard bias layers 130 and 135, respectively, provide electrical connections for the flow of the sensing current Is from a current source 160 to the MR sensor 100. Sensing means 170 connected to leads 140 and 145 sense the change in the resistance due to changes induced in the free layer 110 by the external magnetic field (e.g., field generated by a data bit stored on a disk).

IBM's U.S. Pat. No. 5,206,590 granted to Dieny et al., incorporated herein by reference, discloses an MR sensor operating on the basis of the SV effect.

Another type of spin valve sensor currently under development is an antiparallel (AP)-pinned spin valve sensor. FIG. 2 shows an AP-Pinned SV sensor disclosed in copending Application Ser. No. 08/697,396 by Fontana et al., filed Aug. 23, 1996, and assigned to the assignee of the present invention. In the AP-pinned SV sensor 200 of FIG. 2, the pinned layer is a laminated structure of two ferromagnetic layers separated by a non-magnetic coupling layer such that the magnetizations of the two ferromagnetic layers are strongly coupled together antiferromagnetically in an antiparallel orientation. The exchange coupling between the antiferromagnetic (AFM) layer and the laminated pinned layer of AP-pinned SV sensor of FIG. 2 is substantially stronger than the exchange coupling between the AFM layer and the single pinned layer of the SV sensor of FIG. 1. This improved exchange coupling increases the stability of the AP-pinned SV sensor at high temperatures which allows the use of corrosion resistant antiferromagnetic materials such as NiO for the AFM layer.

Referring again to FIG. 2, a free layer 210 is separated from a laminated AP-pinned layer 220 by a nonmagnetic, electrically-conducting spacer layer 215. The magnetization of the laminated AP-pinned layer 220 is fixed by an AFM layer 230 which is made of NiO. The laminated AP-pinned layer 220 includes a first ferromagnetic layer 222 (PF1) and a second ferromagnetic layer 226 (PF2) separated from each other by an antiparallel coupling (APC) layer 224 of non-magnetic material. The two ferromagnetic layers 222, 226 in the laminated AP-pinned layer 220 are formed of Co and the APC layer 224 is formed of Ru. The AFM layer 230 is formed on a seed layer 240 deposited on the substrate 250. To complete the AP-pinned SV sensor, a capping layer 205 is formed on the free layer 210.

A key advantage of the AP-pinned SV sensor of FIG. 2, that allows the use of Nio material for the AFM layer, is the improvement of the exchange coupling field strength between the AFM layer 230 and AP-pinned layer 220. This exchange coupling field is inversely proportional to the magnetic moment difference (net magnetic moment) between the two AP-pinned ferromagnetic layers.

However, experiments by the present inventor on fabrication of AP-pinned SV sensors of FIG. 2 (layered structure of NiO/Co/Ru/Co/Cu/Ni—Fe/Ta) have shown that the net moment of the laminated AP-pinned structure of Co/APC/Co is very difficult to control and reproduce because of interfacial diffusion and oxidation that takes place at the interface between the NiO AFM layer and the first ferromagnetic layer of Co. The interfacial diffusion and oxidation that takes place at the aforementioned interface causes a change in the moment of the first ferromagnetic Co layer even after the AP-pinned SV sensor of FIG. 2 has been completely built. The change in the moment of the first ferromagnetic layer causes the change in the net moment of the AP-pinned layer. These experiments have resulted in variations by factors of 2 to 3 in the net moments of the AP-pinned layers for successive fabrication runs. Variations in net moment of the AP-pinned structure results in large variations in pinning fields which compromises the stability of the SV sensors. Furthermore, experiments conducted have shown that Co deposited on an NiO AFM layer has a very large coercivity, but low exchange pinning to the NiO AFM layer. The large coercivity of the Co layer makes it very difficult to reset the magnetization direction of the pinned layer if such a reset becomes necessary. Such a reset may become necessary if the magnetization direction of the pinned layer becomes disoriented, for example, in the disk drive due to a large unexpected magnetic field.

Therefore, there is a need for an AP-pinned SV sensor where the AP-pinned layer has a well controlled and reproducible net moment.

SUMMARY OF THE INVENTION

It is an object of the present invention to disclose an improved AP-Pinned SV sensor having a AP-pinned layer where the net moment and magnetic properties of the AP-pinned layer is well controlled.

It is another object of the present invention to disclose an AP-pinned SV sensor with the structure of substrate/seed layer/pinned layer/spacer/free layer where the pinned layer comprises a first and a second ferromagnetic pinned layer and where the first ferromagnetic pinned layer further comprises first and second ferromagnetic sub-layers.

In accordance with the principles of the present invention, there is disclosed an AP-pinned SV sensor with the preferred structure of Substrate/Seed/NiO/Ni—Fe/Co/Ru/Co/Cu/Ni—Fe/Cap where the AP-pinned layer comprises a first and a second ferromagnetic pinned layer separated from each other by an anti-parallel coupling layer. The first ferromagnetic pinned layer comprises a first Ni—Fe sub-layer and a second Co sub-layer. The first Ni—Fe sub-layer is deposited over and in contact with the NiO AFM layer. The addition of the Ni—Fe sub-layer isolates the Co layer from the NiO AFM layer which results in improving the pinning field and magnetic moment control of the laminated AP-pinned layer structure as well as reducing the coercivity of the first pinned layer.

The above as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
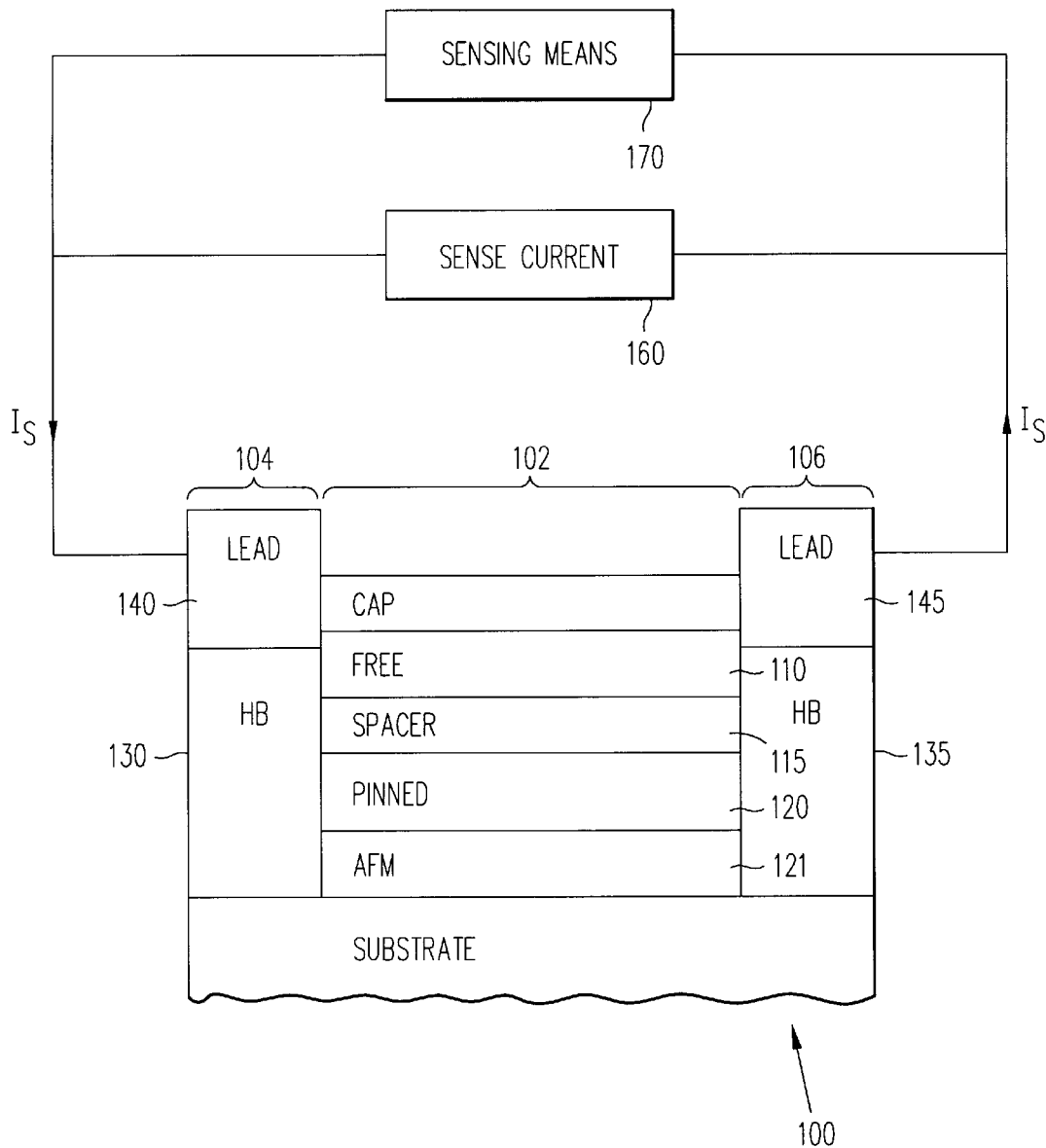
FIG. 1 is a sectional view of a prior art SV sensor.
Figure 2:
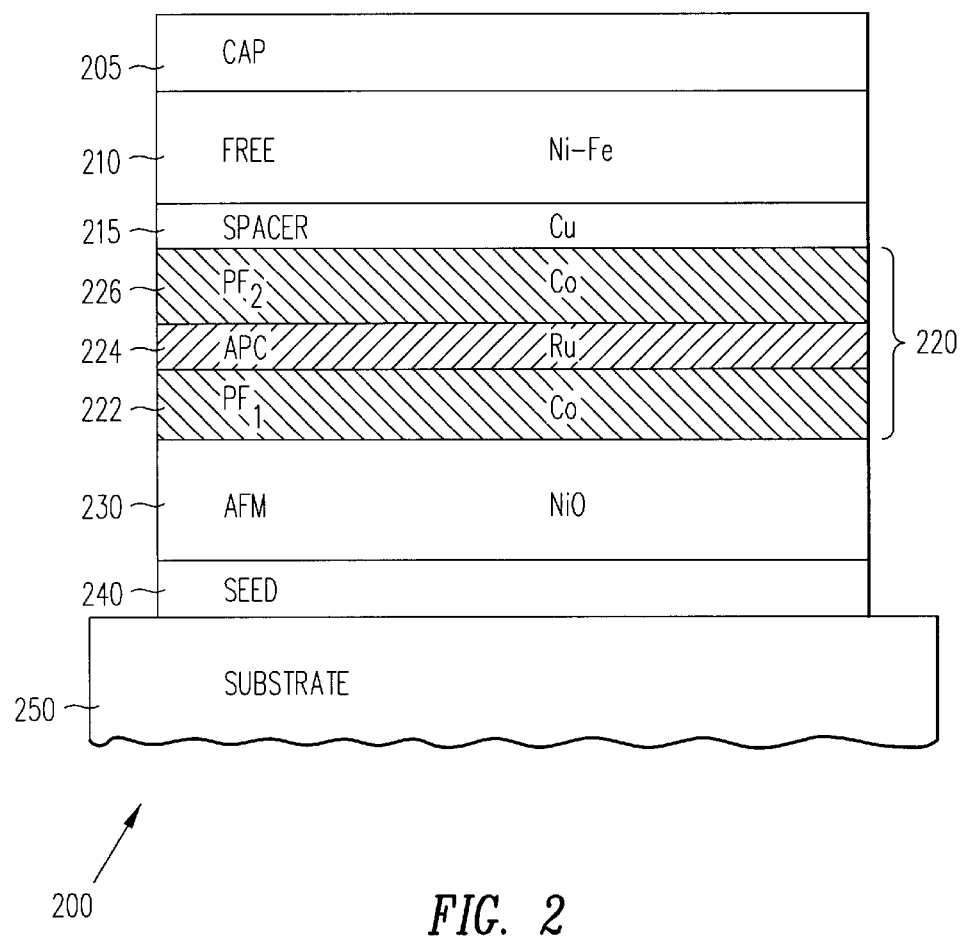
FIG. 2 is a sectional view of an AP-pinned SV sensor.
Figure 3:
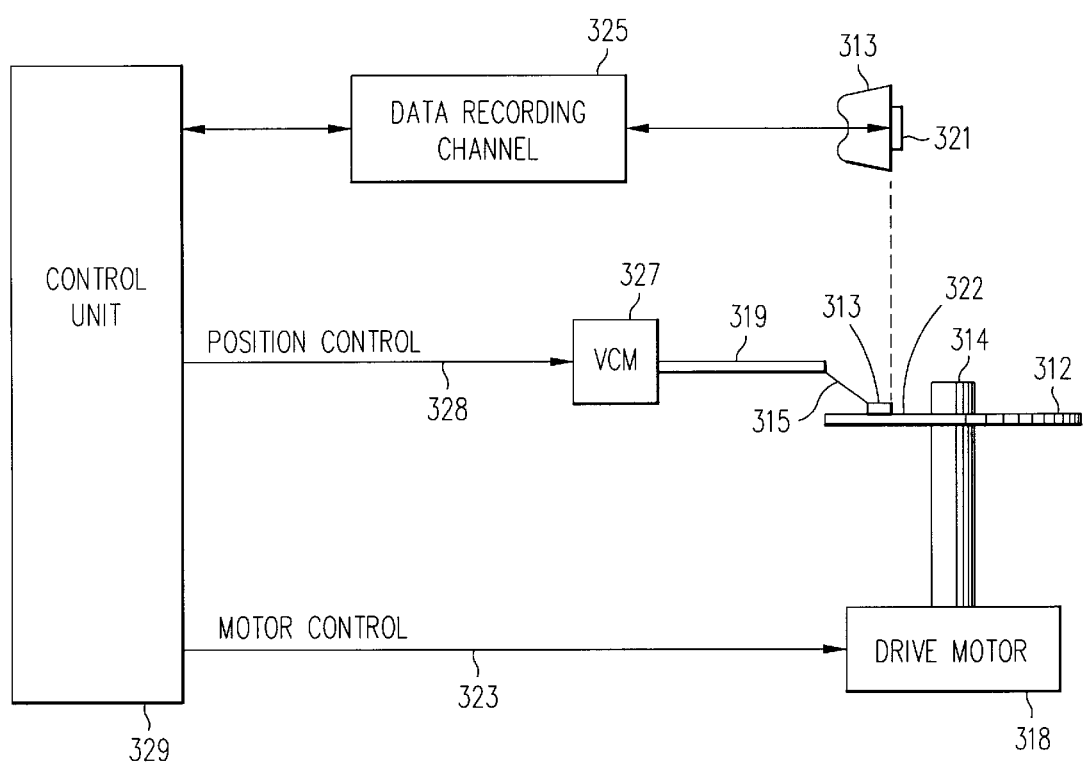
FIG. 3 is a simplified drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321 where the head 321 incorporates the MR sensor of the present invention. As the disks rotate, slider 313 is moved radially in and out over disk surface 322 so that heads 321 may access different portions of the disk where desired data is recorded. Each slider 313 is attached to an actuator arm 319 by means of a suspension 315. The suspension 315 provides a slight spring force which biases slider 313 against the disk surface 322. Each actuator arm 319 is attached to an actuator means 327. The actuator means as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 (the surface of slider 313 which includes head 321 and faces the surface of disk 312 is referred to as an air bearing surface (ABS)) and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by means of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
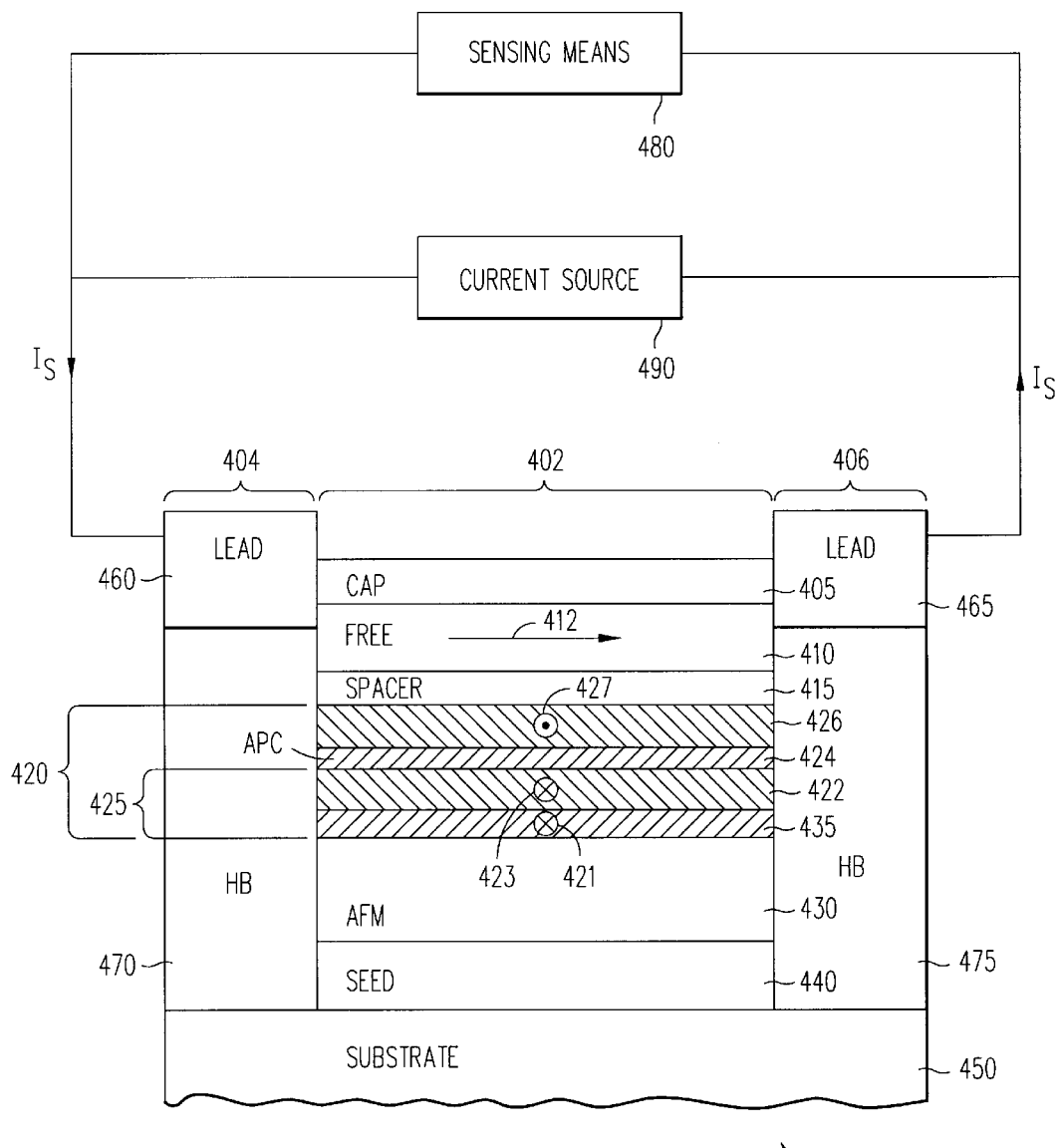
FIG. 4 is an air bearing surface view of the AP-pinned SV sensor according to the present invention.

FIG. 4 shows an air bearing surface (ABS) view of the AP-pinned SV sensor 400 according to the preferred embodiment of the present invention. SV sensor 400 has end regions 404 and 406 separated from each other by a central region 402. Substrate 450 can be any suitable substance, including glass, semiconductor material, or a ceramic material, such as alumina ($Al_2O_3$). Seed layer 440 is any layer deposited on substrate 450 for the purpose of modifying the crystallographic texture or grain size of the subsequent layers deposited on the seed layer 440. The seed layer 440 may not be needed depending on the type of substrate used. If used, the seed layer 440 may be formed of tantalum (Ta), zirconium (Zr), nickel-iron (Ni—Fe), or $Al_2O_3$. In the preferred embodiment, seed layer 440 is made of Ta. Subsequent to the deposition of the seed layer 440, antiferromagnetic (AEM) layer 430 of NiO material is formed over the seed layer. The NiO AFM layer 430 is formed over the seed layer 440 by ion beam sputtering a Ni target in the presence of an oxygen-containing gas to the thickness at which the desired exchange properties are achieved, typically 200–500 Å. A laminated AP-pinned layer 420 is subsequently formed over the AFM layer 430. AP-pinned layer 420 comprises first and second pinned ferromagnetic layers 425 and 426, respectively. The first pinned ferromagnectic layer 425 is a composite layer comprising first and second pinned ferromagnetic sub-layers 435 and 422, respectively. In the preferred embodiment, first sub-layer 435 is a thin layer of Ni—Fe deposited on and in contact with the AFM layer 430 and the second sub-layer 422 is a layer of Co deposited over first sub-layer 435. The second ferromagnetic layer 426, also formed of Co, has equal or nearly equal magnetic moment to Co layer 422. First and second ferromagnetic pinned layers 425 and 426 are separated from each other by an antiparallel coupling (APC) layer 424 of nonmagnetic material that allows pinned layers 425 and 426 to be strongly coupled together antiferromagnetically. Pinned layers 425 and 426 in the laminated AP-pinned layer structure 420 have their magnetization directions oriented antiparallel, as indicated by the tails of the arrows 421 and 423 and the head of the arrow 427. The antiparallel alignment of the magnetizations of the pinned layers 425 and 426 is due to an antiferromagnetic exchange coupling through the anti-parallel coupling layer 424.

Because of this antiferromagnetic coupling, and because the two Co films 422 and 426 have substantially the same thickness, the magnetic moments of each of the films nearly cancel each other so that the net magnetic moment in the laminated AP-pinned layer 420 structure is mainly due to the magnetic moment of the Ni—Fe sub-layer 435, typically in the range of 2 to 30 Å in thickness. The small net magnetic moment of the laminated AP-pinned layer 420 results in an amplification of the exchange field above that which would be present if only layer 422 were used as a single pinned layer pinned by AFM layer 430.

To complete the SV sensor 400, a metallic spacer layer 415 is formed on the second pinned layer 426, a free layer 410 is formed on the spacer layer 415, and a capping layer 405 is formed on the free layer 410. In the absence of an applied field, the free layer 410 has its magnetization axis oriented in the direction shown by arrow 412, i.e., generally perpendicular to the magnetization axes 421, 423, 427 of the pinned layers 435, 422, 426.

Referring again to FIG. 4, SV sensor 400 further includes hard bias layers 470 and 475, formed in end regions 404 and 405, respectively, for longitudinally biasing the free layer 410. Electrical leads 460, 465 are also formed over hard bias layers 470 and 475, respectively to form a circuit path between the SV sensor 400 and a current source 490 and a sensing means 480. In the preferred embodiment, a magnetic signal in the medium is sensed by the sensing means 480 detecting the change in resistance, deltaR, as the magnetization of the free layer 410 rotates in response to the applied magnetic signal from the recorded medium.

The AP-pinned SV sensor 400 was fabricated in the following manner. The NiO AFM layer 430 of approximately 425 Å thick was deposited on the aluminum oxide substrate layer 450 by ion beam sputtering from a Ni target in the presence of oxygen. No seed layer was used on the aluminum oxide substrate. Next, the laminated AP-pinned layer 420, spacer 415, free layer 410 and cap layer 405 were deposited by ion beam sputtering while the sample was in an applied transverse magnetic field of about 20 Oe. Ni—Fe layer 435 had a thickness of about 10 Å, Cobalt layer 422 had a thickness of about 24 Å, spacer layer 424 had a thickness of about 5 Å, cobalt layer 426 had a thickness of about 24 521 , spacer 415 had a thickness of about 22 Å, free layer 410 had a thickness of about 72 Å and the Ta cap layer 405 had a thickness of about 50 Å.

After all the layers of SV sensor 400 have been deposited, the AFM layer 430 will likely not be in a single antiferromagnetic domain state, and as a result the Ni—Fe/Co/Ru/Co laminated AP-pinned layer 420 may not be in a single ferromagnetic domain state, resulting in reduced magnetoresistance amplitude. Therefore, after all the layers of the SV sensor 400 have been deposited, the SV sensor 400 was heated to above the NiO antiferromagnetic blocking temperature (about 180 deg C) in a field of 15 kOe. This large field is sufficient to rotate the magnetization of the ferromagnetic layers in the AP-pinned layer 420 against the effect of the anti-parallel coupling layer 424, so that the magnetizations of both pinned ferromagnetic layers 425 and 426 are parallel to the applied magnetic field, and both pinned ferromagnetic layers are in a single domain state. The sample was then cooled with the applied field still present, so that the single domain state of the NiO/Ni—Fe/Co portion of the laminated AP-pinned layer 420 was maintained. After cooling to room temperature the applied field is removed, and the magnetization of the second pinned ferromagnetic layer 426 rotates to be antiparallel to that of the first pinned ferromagnetic layer 425 due to the influence of the anti-parallel coupling layer 424. This aligns the direction of the exchange anisotropy and places the laminated AP-pinned layer 420 in an essentially single domain state, yielding the largest magnetoresistance.

Referring again to FIG. 4, if the thickness of the two ferromagnetic Co layers 422 and 426 are identical, then in theory the net moment of the laminated AP-pinned layer 420 would be the moment of the thin Ni—Fe layer 435. Without Ni—Fe layer 435, net moment control would depend on precise control of the Co layers thicknesses and on the stability of the Co layer at the NiO/Co interface which is extremely difficult to control. Introduction of Ni—Fe layer 435 between the NiO AFM layer 430 and the first Co layer 422 dramatically improves control of the magnetic moment of the first Co layer 422. With this improved structure, moment control of the two Co films 422, 426 is reduced essentially to thickness control of the Ni—Fe deposited layer. With equal thicknesses of Co layers 422, 426, the net moment of the laminated AP-pinned layer 420 is equal to the moment of Ni—Fe layer 435. A thin Ni—Fe layer 435 ensures a small, well-controlled net moment which ensures that the magnetization of the laminated AP-pinned layer 420 is stable in the presence of magnetic fields so that the direction of magnetization is predictable.

While the best embodiment of this invention described herein has used equal thicknesses of the two Co layers 422, 426, it will be obvious to those skilled in the art that other combinations of the thicknesses of Co layer 422 and Ni—Fe layer 435 can result in the same small net moment for the laminated AP-pinned layer structure. If Co layer 422 is made thinner, then Ni—Fe layer 435 must be increased in thickness to achieve the desired net moment, and if Co layer 422 is made thicker a correspondingly thinner Ni—Fe layer 435 is required.

The AP-pinned SV sensors fabricated according to the best embodiment of this invention have significantly improved characteristics and batch-to-batch reproducibility. The pinning field $H_p$ (magnetic field at which the pinned layer begins to rotate) is approximately 1100 Oe ensuring no rotation of the AP-pinned layer under SV sensor operating conditions. The ferromagnetic coupling field between the pinned and free layers is only about 4 Oe indicative of high sensitivity of the free layer to rotate in response to external signal fields. The magnetoresistive coefficient (deltaR/R) is about 4.3% and the batch-to-batch variation (variation of properties of SV sensors processed in one fabrication run to those processed in a different run) was less than +/−4 percent for more than 20 batches.

Figure 5:
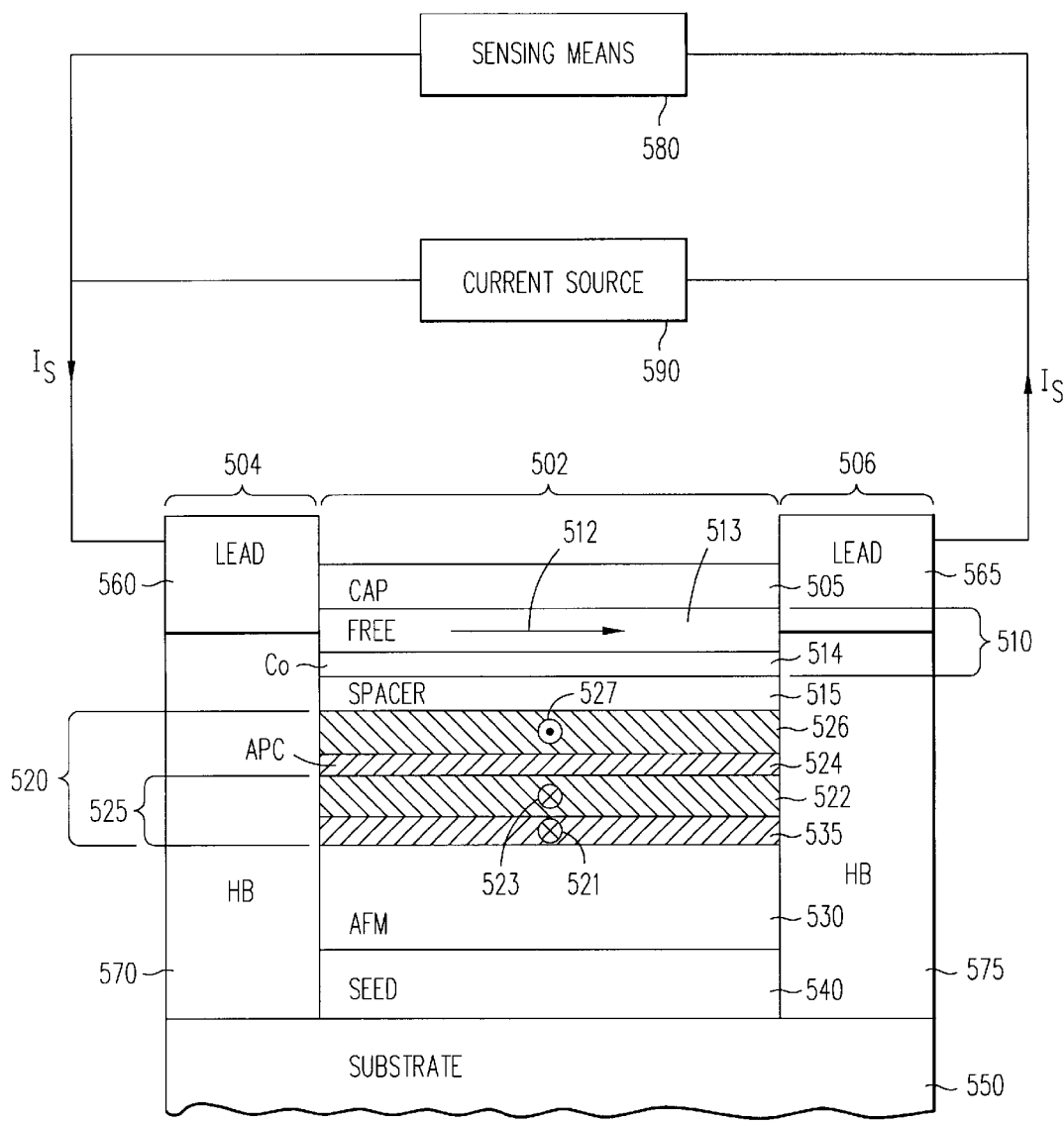
FIG. 5 is an air bearing surface view of an alternate embodiment of the AP-pinned SV sensor of the present invention.

FIG. 5 shows an ABS view of an alternate embodiment of an AP-pinned SV sensor 500 having end regions 504 and 506 separated from each other by a central region 502. SV sensor 500 is similar to SV sensor 400 but wherein the free layer 510 is a multi-layer structure. In the preferred embodiment, the SV sensor 500 has a structure according to the following: Substrate/seed/NiO/Ni—Fe/Co/Ru/Co/Cu/Co/Ni—Fe/Cap. A seed layer 540, if used, is deposited on a substrate 550. The NiO AFM layer 530 is deposited on seed layer 540 by ion beam sputtering a Ni target in the presence of an oxygen. The laminated AP-pinned layer 520 is formed on the AFM layer 530. The first ferromagnetic pinned layer 525 is a composite layer comprising a thin Ni—Fe layer 535 deposited on and in contact with the AFM layer 530 and a Co layer 522 deposited on the Ni—Fe layer 535. The second ferromagnetic pinned layer 526, also formed of Co, has a magnetic moment which is equal or nearly equal to the magnetic moment of the Co layer 522. The two Co layers 522, 526 are separated by an anti-parallel coupling layer 524 of nonmagnetic material that allows the pinned layers 525 and 526 to be strongly coupled together antiferromagnetically. A metallic spacer layer 515 is formed on the second ferromagnetic pinned layer 526. In this embodiment, the free layer 510 is a multilayer structure comprising a thin Co layer 514 and a Ni—Fe layer 513. Co layer 514 is formed on and in contact with the spacer layer 515 and Ni—Fe layer 513 is formed on and in contact with the Co layer 514. To complete the SV sensor 500, a capping layer 505 is formed on the Ni—Fe layer 513. In the absence of an applied field, the free layer 510 has its magnetization axis oriented in the direction shown by arrow 512, i.e., generally perpendicular to the magnetization axes 521, 523, 527 of the pinned layers 535, 522, 526.

Referring again to FIG. 5, SV sensor 500 further includes hard bias layers 570 and 575, formed in the end regions 504 and 506, respectively, for longitudinally biasing the free layer 510. Electrical leads 560 and 565 are also formed over hard bias layers 570 and 575, respectively, to form a circuit path between the SV sensor 500 and a current source 590 and a sensing means 580.

In this embodiment, the Co free layer 514 has a thickness of about 16 Å and the Ni—Fe free layer 513 has a thickness of about 29 Å thick. The magnetoresistive coefficient deltaR/R for this embodiment has a value of 7.5%. The improvement of deltaR/R over that obtained with the preferred embodiment shown in FIG. 4 is due to the better interface properties between the composite free layer 514 and the spacer 515. However, the use of a composite free layer adds to the complexity of the fabrication process for this SV sensor.

Figure 6:
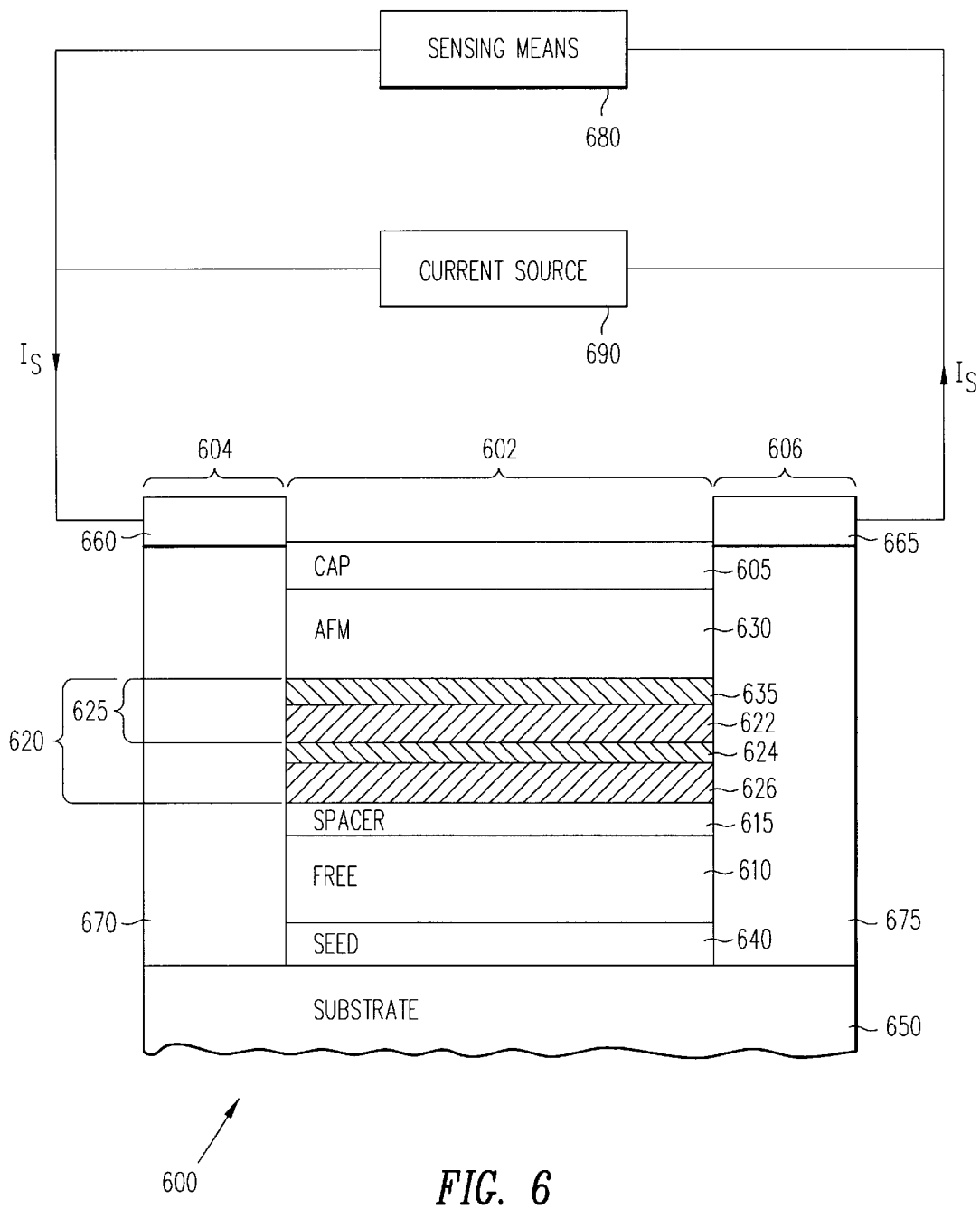
FIG. 6 is an air bearing surface view of a second alternate embodiment of the AP-pinned SV sensor of the present invention.

FIG. 6 shows an air bearing surface view of a second alternative embodiment of an AP-pinned SV sensor 600 similar to that of FIG. 4 but wherein the free layer 610 is on the bottom (near substrate 650) of the SV sensor and the AP-pinned layer 620, having first and second pinned layers 625 and 626, is formed on the top of the spacer 615. After deposition of free layer 610, spacer layer 615 is deposited followed by Co layer 626, Ru APC layer 624, Co layer 622, and Ni—Fe layer 635. The AFM layer 630 is then deposited on Ni—Fe layer 635 followed by depositing the cap layer 605. The AFM layer 630 is preferably made of NiO material although it may also be made of other anitiferromagnetic material such as NiMN. Hard bias layers 670 and 675 longitudinally bias the free layer 610. Electrical leads 660, 665, formed on the hard bias layers 670 and 675, respectively, are provided to form a circuit path between the SV sensor 600, a current source 690, and a sensing means 680.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A disk drive system, comprising:
    a magnetic recording disk;
    a spin valve magnetoresistive sensor for sensing magnetically recorded data on the disk, the spin valve sensor comprising:
        a free ferromagnetic layer;
        an antiparallel pinned layer including:
            an antiparallel coupling layer;
            first and second ferromagnetic layers separated from each other by said antiparallel coupling layer, said antiparallel coupling layer being in contact with said first and second ferromagnetic layer, said first ferromagnetic layer further comprising first and second ferromagnetic sub-layers, and wherein the thickness of the first ferromagnetic sub-layer is less than the thickness of the second ferromagnetic sub-layer and the second ferromagnetic layer;
        an antiferromagnetic (AFM) layer in contact with said said first ferromagnetic sub-layer for pinning the magnetization of said first ferromagnetic layer; and
        a spacer layer disposed between said free ferromagnetic layer and said antiparallel pinned layer, said spacer layer being in contact with said free ferromagnetic layer and said second ferromagnetic layer;
    an actuator for moving said spin valve sensor across the magnetic recording disk so the spin valve sensor may access different regions of magnetically recorded data n the magnetic recording disk; and
    means electrically coupled to the spin valve sensor for detecting changes in resistance of the sensor caused by rotation of the magnetization axis of the free ferromagnetic layer relative to the fixed magnetizations of the antiparallel coupled first and second ferromagnetic layers in the laminated antiparallel pinned layer in response to magnetic fields from the magnetically recorded data.

2. The disk drive system as recited in claim 1 wherein said second ferromagnetic layer is made of cobalt.

3. The disky drive system as recited in claim 2 wherein said first sub layer is made of Ni—Fe and said second sub layer is made of Co.

4. The disky drive system as recited in claim 3 wherein the Ni—Fe compostion of said first sub-layer is approximately 81% Ni and 19% Fe.

5. The disky drive system as recited in claim 3 wherein the Ni—Fe thickness of said first sub-layer is in the range of approximately 2–30 Angstroms.

6. The disky drive system as recited in claim 1 wherein the thickness of first ferromagnetic layer is larger than the thickness of the second ferromagnetic layer.

7. The disky drive system as recited in claim 1 wherein the thickness of first ferromagnetic layer is smaller than the thickness of the second ferromagnetic layer.

8. A spin valve magnetoresistive sensor, comprising:

a free ferromagnetic layer;

an antiparallel (AP)-pinned layer including:
   an antiparallel coupling layer;
   first and second ferromagnetic layers separated from each other by said antiparallel coupling layer, said antiparallel coupling layer being in contackt with said first and seocnd ferromagnetic layers, said first ferromagnetic layer further comprising first and second ferromagnetic sub-layers, and wherein the thickness of the first ferromagnetic sub-layer is less than the thickness of the second ferromagnetic sub-layer and the second ferromagnetic layer;

and antiferromagnetic (AFM) layer in contact with said said first ferromagnetic sub-layer for pinning the magnetization of said first ferromagnetic layer; and a spacer layer disposed between said free ferromagnetic layer and said AP-pinned layer, said spacer layer being in contact with said free ferromagnetic layer and said second ferromagnetic layer.

9. The spin valve magnetoresistive sensor as recited in claim 8 wherein said second ferromagnetic layer is made of cobalt.

10. The spin valve magnetoresistive sensor as recited in claim 9 wherein said first sub-layer is made of Ni—Fe and said second sub-layer is made of Co.

11. The spin valve magnetoresistive sensor as recited in claim 10 wherein the Ni—Fe composition of said first sub-layer is approximately 81% Ni and 19% Fe.

12. The spin valve magnetoresistive sensor as recited in claim 10 wherein the Ni—Fe thickness of said first ferromagnetic sub-layer is in the range of approximately 2–30 Angstroms.

13. The spin valve magnetoresistive sensor as recited in claim 8 wherein the thickness of first ferromagnetic layer is larger than the thickness of the second ferromagnetic layer.

14. The spin valve magnetoresistive sensor as recited in claim 8 wherein the thickness of first ferromagnetic layer is smaller than the thickness of the second ferromagnetic layer.

\* \* \* \* \*